(12) United States Patent
Akselsen

(10) Patent No.: US 8,189,535 B2
(45) Date of Patent: May 29, 2012

(54) CONNECTION HANDOVER HANDLING

(75) Inventor: Klaus Dyhrmann Akselsen, Dronningmolle (DK)

(73) Assignees: Telmost Holding ApS (DK); Thrupoint, Inc., New York, NY (US)

( * ) Notice: Subject to any disclaimer, the term of this patent is extended or adjusted under 35 U.S.C. 154(b) by 43 days.

(21) Appl. No.: 12/810,326

(22) PCT Filed: Sep. 26, 2008

(86) PCT No.: PCT/DK2008/000335
§ 371 (c)(1),
(2), (4) Date: Jun. 24, 2010

(87) PCT Pub. No.: WO2009/049620
PCT Pub. Date: Apr. 23, 2009

(65) Prior Publication Data
US 2010/0329209 A1    Dec. 30, 2010

(30) Foreign Application Priority Data

Oct. 19, 2007    (DK) .................................. 2007 01507

(51) Int. Cl.
*H04W 4/00* (2009.01)
(52) U.S. Cl. .......................... 370/331; 370/338; 370/401
(58) Field of Classification Search .......................... None
See application file for complete search history.

(56) References Cited

U.S. PATENT DOCUMENTS

| | | | |
|---|---|---|---|
| 7,050,824 B2 * | 5/2006 | Masseroni et al. | 455/522 |
| 2004/0266426 A1 | 12/2004 | Marsh | |
| 2009/0191878 A1 * | 7/2009 | Hedqvist et al. | 455/441 |

FOREIGN PATENT DOCUMENTS

| | | | |
|---|---|---|---|
| WO | WO 02067533 A1 * | 8/2002 | |
| WO | 2005711998 A1 | 8/2005 | |
| WO | 2007047477 A1 | 4/2007 | |

OTHER PUBLICATIONS

International Search Report PCT/DK2008/000335; Dated Mar. 4, 2009.

* cited by examiner

*Primary Examiner* — Kwang B Yao
*Assistant Examiner* — Alex Skripnikov
(74) *Attorney, Agent, or Firm* — Cantor Colburn LLP

(57) ABSTRACT

A connection handover handling between a mobile communication device and a second communication device wherein the server is connected to a wireless local area network and a wireless wide area network. The method includes the steps of receiving a signal indicative of a status of the connectivity between the mobile communication device and the wireless local area network; and depending on the connectivity status, controlling a handover process. Where the connectivity status of the connection between the mobile communication device and the wireless local area network is bad and the mobile communication device is connected to the wireless local area network, handing over the connection from the wireless local area network to the wide area wireless network. Where the connectivity status of the connection between the mobile communication device and the wireless local area network is good and the mobile communication device is not connected to the wireless local area network, handing over the connection to the wireless local area network is provided. A device and computer program product thereof is also provided.

16 Claims, 6 Drawing Sheets

CONNECTION HANDOVER HANDLING

TECHNICAL FIELD

The present invention relates to a method for handling a wireless connection and a server and computer program product thereof.

BACKGROUND

Mobile communication devices, such as mobile phones or personal digital assistants (PDAs), are today used for many different purposes.

Most commonly such mobile communication devices have access only to one type of network. A typical case is mobile phones only having access to a mobile communications network of the Global System for Mobile communications (GSM) type. As is commonly known the GSM system is a typical example of a cellular network, said network comprising a plurality of covering cells served by base stations, which base stations facilitate the communication between the mobile communication device and the network. As the mobile communication device moves from one geographical location to another it will move from the covering cell of a first base station to the covering cell of a second base station. The process of handling the communication switch of the mobile communication device from the first base station to the second base station is called a handover.

Moreover, during recent years different types of wireless wide area as well as local area networks have been developed and deployed. Examples of wireless local area networks include wireless Voice over IP (VoIP, Voice over Internet Protocol) networks, WiMAX (Worldwide Interoperability for Microwave Access) networks, etc. Typically the wireless local area networks comprises covering cells served by so-called access points.

Mobile communication devices with functionalities for both wireless wide area networks, such as GSM, and wireless local area networks, such as wireless VoIP networks, have been introduced. However there is still a problem with handover from wireless networks of different types. This type of handover is usually referred to as a vertical handover.

WO2005071998 discloses a method for performing a vertical handover of a wireless voice connection, wherein the decision for performing the handover is based on a set of handover factors. Hence WO2005071998 discloses a method for determining when such a vertical handover may be performed. However the problem of how to perform such a vertical handover in an efficient manner still remains. Typically, methods for vertical handovers cannot deploy known handover techniques which have been established for handovers within one single network, such as the above example regarding handovers in a GSM system. In view of the above, the invention seeks to solve or at least reduce the problems discussed above. In particular, the invention provides a method for handling a connection between a mobile communication device and a second communication device via a server.

BRIEF SUMMARY

Hence there is provided a method in a server for handling a connection between a mobile communication device and a second communication device, wherein the server is connected to a wireless local area network and a wireless wide area network, wherein the method comprises receiving a signal indicative of a status of the connectivity between the mobile communication device and the wireless local area network; and depending on the connectivity status, controlling a sticky handover process, wherein in a case the connectivity status of the connection between the mobile communication device and the wireless local area network is bad and the mobile communication device is connected to the wireless local area network, handing over the connection from the wireless local area network to said wide area wireless network; and in a case the connectivity status of the connection between the mobile communication device and the wireless local area network is good and the mobile communication device is not connected to the wireless local area network, handing over the connection to the wireless local area network.

Thus, such a method allows for a seamless handover between wireless local area networks and wireless wide area networks, or in other words for seamless roaming between disparate networks. Moreover the method has the additional advantage of being centralized in a server which is in contact with both the wireless local area network and the wireless wide area network throughout the duration of the connection.

The signal indicative of a status of the connectivity between the mobile communication device and the wireless local area network may be composed of one or more packets of data. It may further comprise a stream of data. Furthermore, the term indicative of a status should in this context be interpreted widely; any measurement, calculation, characterization and/or interpretation of the connectivity status as good or bad may either be performed in the server or in the mobile communication device. Moreover the connectivity status may be a combination of the connectivity status as estimated by the server and the connectivity status as estimated by the mobile communication device.

The method may further comprise associating the mobile communication device with a wireless local area network address; associating the mobile communication device with a unique identity in a wireless wide area network; and storing the address and the unique identity.

Hence identification information pertaining to the mobile communication device is stored in the server which enables the connection between the mobile communication device and a second communication device to be anchored in the server.

In the case the connectivity status of the connection between the mobile communication device and the wireless local area network is bad and the mobile communication device is connected to the wireless local area network, the sticky handover process may further comprise determining the unique identity of the mobile communication device using the wireless local area network address of the mobile communication device; initiating the wireless wide area network connection from the server to the mobile communication device using the unique identity; establishing a connection between the mobile communication device and the second communication device via the server, wherein the connection between the mobile communication device and the server is a connection in the wireless wide area network; terminating the wireless local area network connection between the mobile communication device and the server; and in the case the connectivity status of the connection between the mobile communication device and the wireless local area network is good and the mobile communication device is not connected to the wireless local area network, the sticky handover process may further comprise determining the wireless local area network address of the mobile communication device using the unique identity of the mobile communication device; initiating the wireless local area network connection from the server to the mobile communication device using the wireless local area network address; establishing a connection between the mobile communication device and the second communication device via the server, wherein the connection between the mobile communication device and the server is a connection in the wireless local area network; and terminating the wireless wide area network connection between the mobile communication device and the server.

The method may further comprise detecting that the connection between the mobile communication device and the wireless local area network is lost; determining the unique identity of the mobile communication device using the wireless local area network address of the mobile communication device; and as a consequence of the detection using the unique identity to perform the sticky handover of the connection from the wireless local area network to the wireless wide area network.

Hence, such a method prevents an unexpected loss of connection in a wireless local area network by seamlessly handing over the connection to a wireless wide area network. This is made possible since identification information of the mobile communication device in both the wireless local area network and the wireless wide area network is stored in the server The method may further comprise indicating to the second communication device a temporary loss of connection pertaining to the detection of a lost connection between the mobile communication device and the wireless local area network. Such an indication may e.g. take the form of a pre-recorded voice message. Hence the proposed method possesses the added advantage of increasing the user experience since the risk of having a loss of connection is significantly reduced.

The signaling between the mobile communication device and the server may utilize GPRS (General Packet Radio Service) in a case the mobile communication device is connected to the server via a wireless wide area network. Furthermore the traffic data communication between the mobile communication device and the server may utilize GPRS in a case the mobile communication device is connected to the server via a wireless wide area network.

Thus a further advantage is the ability only to utilize the capabilities for transmitting e.g. voice as packet data over GPRS instead of establishing a common voice connection.

The wireless local area network may be one of a plurality of available wireless local area networks including: any IEEE 802.11x network (Institute of Electrical and Electronics Engineers), WiMAX, Bluetooth; the wireless wide area network may be one of a plurality of available wireless wide area networks comprising: UMTS (Universal Mobile Telecommunications System), GPRS, EDGE (Enhanced Data rates for GSM Evolution), GSM; and the wireless local area networks and the wireless wide area networks may be prioritized according a specific order.

Hence the method enables a choice of a preferred network from a plurality of networks. For example the wireless local area networks and the wireless wide area networks may be prioritized according to the order: 1) IEEE 802.11x, 2) WiMAX, 3) UMTS, 4) GPRS, 5) EDGE, 6) GSM, 7) Bluetooth. Not all of these networks may be available at a specific location and/or at a specific time period. Note that the invention is not limited to a particular set of existing wireless networks; the invention is also applicable to any new mobile radio technology which involves handover from a first type of wireless network to a second type of wireless network.

According to another aspect there is also provided a method in a mobile communication device, comprising associating the mobile communication device with a unique identity in a wireless wide area network; receiving client information; associating the client information with a wireless local area network address; configuring the mobile communication device for communication over a plurality of wireless local area networks and a plurality of wireless wide area networks; receiving a signal indicative of a sticky handover from the server; and depending on the signal performing a sticky handover process, wherein in a case the mobile communication device is connected to the server via the wireless local area network switching the connection from the wireless local area network to a wireless wide area network; and in a case the mobile communication device is connected to the server via a wireless wide area network switching the connection from the wireless wide area network to the wireless local area network.

Hence one advantage with the proposed method is that although the mobile communication device may be capable of operating in a plurality of different networks only one identity, such as a phone number, is needed in order for a user of a second communication device to contact a user of said mobile communication device. Thus the user of the mobile communication device have access to the sum of the functionalities in all accessible wireless networks (where available).

The method in a mobile communication device may further comprise detecting that the connection between the mobile communication device and the wireless local area network is lost; waiting for a signal indicative of a new connection whilst remaining in a standby mode; and indicating a temporary loss of connection pertaining to said detection of a lost connection between the mobile communication device and the wireless local area network.

Hence a method for preventing a loss of connection in a wireless local area network is proposed. A similar method may also be applied in case a loss of connection in a wireless wide area network is detected. Again the proposed method possesses the added advantage of increasing the user experience since the risk of having a loss of connection is significantly reduced.

The method in a mobile communication device may further comprise measuring a signal indicative of a status of the connectivity between the mobile communication device and a server via the wireless local area network; and transmitting information pertaining to the measured signal to said server.

Note that in contrast to the method in a server as described above the mobile communication device is not arranged to receive a signal indicative of a status of the connectivity between the mobile communication device and a server via the wireless local area network; the mobile communication device may measure and then transmit information pertaining to the measured signal to the server.

According to yet another aspect there is provided a server comprising circuitry configured to receive a signal indicative of a status of the connectivity between said mobile communication device and said wireless local area network; and depending on said connectivity status, control a sticky handover process, wherein in a case the connectivity status of the connection between the mobile communication device and the wireless local area network is bad and the mobile communication device is connected to the wireless local area network, hand over the connection from the wireless local area network to said wide area wireless network; and in a case the connectivity status of the connection between the mobile communication device and the wireless local area network is good and the mobile communication device is not connected to the wireless local area network, hand over the connection to the wireless local area network.

Hence such a server carries out a method in a server as discussed above.

Finally, there is also provided a computer program product, comprising computer program code stored on a computer-readable storage medium which, when executed on a processor, carries out a method in a mobile communication device as described above, and a computer program product, comprising computer program code stored on a computer-readable storage medium which, when executed on a processor, carries out a method in a server as described above.

Other features and advantages of the present invention will appear from the following detailed disclosure, from the attached dependent claims as well as from the drawings.

BRIEF DESCRIPTION OF THE DRAWINGS

The above, as well as additional features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION

Figure 1:
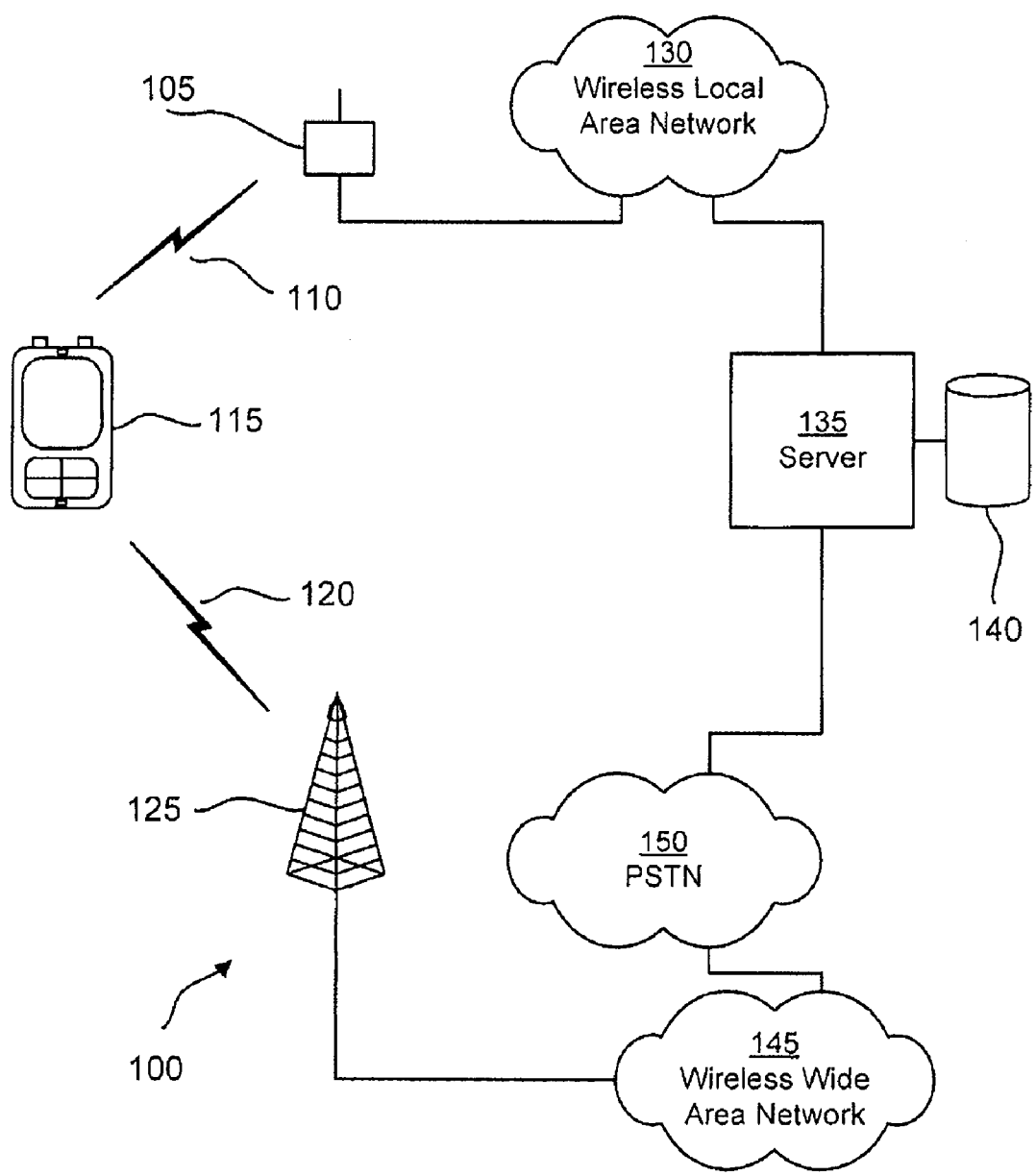
FIG. 1 is a schematic illustration of a communication system, as an example of an environment in which the present invention may be applied.

FIG. 1 illustrates an example of a communications system 100 in which the invention may be applied. In the communications system 100 of FIG. 1, various telecommunications services such as cellular voice calls, www/wap browsing, cellular video calls, data calls, facsimile transmissions, music transmissions, still image transmissions, video transmissions, electronic message transmissions, general data transmission, electronic positioning information, and electronic commerce may be performed between a multi-mode mobile communication device 115 according to the present invention and other communication devices, which devices are not explicitly shown in the figure. It is to be noted that for different embodiments of the mobile terminal 115 and in different situations, different ones of the telecommunications services referred to above may or may not be available; the invention is not limited to any particular set of services in this respect.

The multi-mode mobile communication device 115 is able to communicate locally via a wireless local area communications network 130 through a radio link 110 and via an access point 105. As is known to a person skilled in the art wireless local area networks, such as the network 130, may comprise a plurality of access points, of which only one access point 105 is shown in the figure. The access point 105 is operatively connected to the wireless local area network 130. The wireless local area network 130 may be in compliance with any commercially available wireless local area networks (WLAN) standard, such as any of the IEEE 802.11x standards, WiMAX, or Bluetooth.

The multi-mode mobile communication device 115 is also operatively connected to a wireless wide area communications network 145 through a radio link 120 and via a base station 125. The base station 125 is operatively connected to the wireless wide area network 145. As is known to a person skilled in the art wireless wide area networks, such as the network 145, commonly comprises a plurality of base stations, of which only one base station 125 is shown in the figure. The wireless wide area network 145 may be in compliance with any commercially available mobile telecommunications standard, such as GSM, UMTS, D-AMPS (Digital-Advanced Mobile Phone Service), CDMA2000 (Code division multiple access), FOMA (Freedom of Mobile Multimedia Access) and TD-SCDMA (Time Division-Synchronous Code Division Multiple Access).

A common public switched telephone network (PSTN) 150 is connected to the wide area communications network 145 in a manner known to a person skilled in the art. Various communication terminals (not shown in FIG. 1) are commonly connected to the PSTN 150, the wireless wide area network 145 and the wireless local area network 130.

A multi-mode gateway server 135 is connected to both the wireless local area network 130 and the wireless wide area network 145, wherein the connection between the multi-mode gateway server 135 and the wireless wide area network 145 is via the PSTN 150. Said server handles the wireless connection to and from the multi-mode mobile communication device 115 via either the wireless local area network 130 or via the wireless wide area network 145.

The server 135 may handle identification parameters for identifying the mobile communication device 115 in at least said wireless local area network 130 and at least said wireless wide area network 145. As will be described in more detail below said identification parameters may comprise e.g. a wireless local area network address in said wireless local area network and a unique identifier in said wireless wide area network 145. Thus at any point of the connection stage the server holds information regarding the identity of the mobile communication device in wireless networks in which the multi-mode mobile communication device has been configured to operate. Moreover all connections to and from said multi-mode mobile communication device passes through said server since it is associated with the identity in form of e.g. a phone number of said multi-mode mobile communication device, which phone number a user of the second communication device may use to contact a user of said multi-mode mobile communication device. That is, the user of the second communication device dials said phone number and said server associates said phone number with said corresponding wireless local area network address and/or said unique identifier, thereby establishing a connection from said second communication device to said multi-mode mobile communication device via said server.

Hence all connections to and from said multi-mode mobile communication device may be characterized as being anchored in the multi-mode gateway server 135. The server 135 has a data storage 140 in which said identification parameters of the multi-mode mobile communication device may be stored.

At least one multi-mode mobile communication device 115 capable of communicating with a server 135 and at least one such a server 135 comprising circuitry to perform said method for anchoring a connection in a server will together with the communications system 100 thus according to one aspect of the present invention provide a system for handling a wireless connection, which connection is transformed through a plurality of wireless networks of different types. Hence said communications system 100 facilitates the communication between said at least one multi-mode mobile communication device 115 and said at least one server 135.

Figure 2:
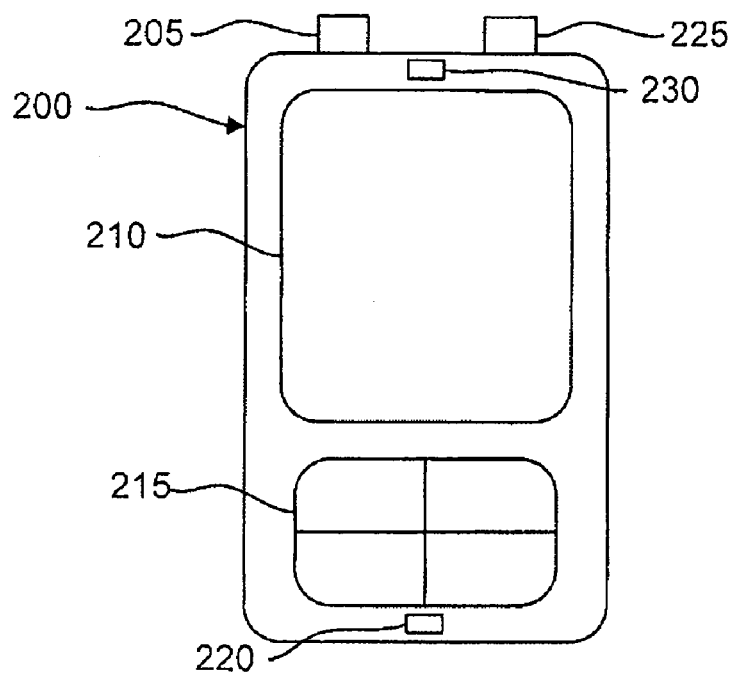
FIG. 2 is a schematic front view illustrating a multi-mode mobile communication device according to an embodiment.

An embodiment 200 of the multi-mode mobile communication device 115 is illustrated in more detail in FIG. 2. The multi-mode mobile communication device 200 may be e.g. a mobile phone or a personal digital assistant (PDA). The multi-mode mobile communication device 200 comprises a display 210, a speaker 230, a microphone 220, antennas 205, 225, and a keypad 215 comprising a set of keys. The two antennas merely 205, 225 symbolizes that the mobile communication device 200 is of multi-mode type, i.e. that the device is capable of communicating with a multitude of different wireless networks using a plurality of different communication modes, such as different protocol standards, e.g. both GSM and VoIP. The multi-mode mobile communication device 200 may further comprise e.g. a digital camera and/or other functionalities or features not explicitly illustrated in connection with the description of FIG. 2.

The internal components 300, software and protocol structures of the multi-mode mobile communication device 200 will now be described with reference to FIG. 3. The multi-mode mobile communication device has a controller 335 which is responsible for the overall operation of the mobile terminal under the supervision of an operating system, which instructions preferably are implemented in a commercially available central processing unit (CPU) 320, such as a digital signal processor (DSP).

The controller 335 has associated electronic memory 330 such as RAM (Random Access Memory), ROM (Read Only Memory), EEPROM (Electrically Erasable Programmable Read-Only Memory), flash memory, or any combination thereof The memory 330 is used for various purposes by the controller 335, one of them being storing data and program instructions for various software in the mobile terminal.

The software includes a real-time operating system, drivers for a user interface (UI) 315, an application handler as well as various applications. The applications can include a messaging application for sending and receiving SMS (Short Message Service), MMS (Multimedia Messaging Service) or email, a media player application, as well as various other applications, such as applications for voice calling, video calling, www/wap browsing, an instant messaging application, a phone book application, a calendar application, a control panel application, a camera application, one or more video games, a notepad application, a positioning application, etc.

The UI 315 also includes one or more hardware controllers, which together with the UI drivers cooperate with the display 210, keypad 215, motion sensor, as well as various other I/O devices such as the microphone 220, the speaker 230, vibrator, ringtone generator, LED (Light Emitting Diode) indicator, etc. As is commonly known, the user may operate the mobile terminal through the user interface thus formed.

The applications 310 may comprise a software client for handling at least part of the mobile communication devices 115, 200 signaling between the mobile communication device 115, 200 and the multi-mode gateway server 135 in FIG. 1. Said signaling may comprise information exchange pertaining to a handover situation between two wireless communication networks of different types. As a result of said signaling the client software may forward various instructions to the controller 335 for further processing by the operating system and the processor 320. Similarly said client may interpret data from a signal indicative of a status of the connectivity between the mobile communication device 115, 200 and the server 135 via said wireless local area network 130. Said signal being communicated to the client application from a common communications interface 305.

The client software may be provided by the manufacturer of the mobile communication device, or by at least one telecommunications network operator, or it may be downloaded to the mobile communication device from a provisioning/configuration server. The client software may also be adapted for different telecommunication operators and/or different types of mobile communication devices. Said provisioning/configuration server may be operatively connected to either the wireless wide area network or the wireless local area network or both. The client software provides the mobile communication device with e.g. a wireless local area network address.

The client and server should preferably be configured with specific parameters to function correctly. This is typically done by entering the configuration parameters directly on the device, from a console attached to the device, or by using an element manager that is specific to each type of device. In order to ease the configuration and subsequent provisioning of both the client and the server application, a provisioning server may be included as part of a system solution. The provisioning server includes logic to ensure that the client and server configuration is indeed synchronized such that it will interact and function correctly. In addition to ensuring correct configuration, the provisioning server is also able to facilitate downloading of the client application to various handsets using various handset providers specific methods for OTA (Over The Air) provisioning. The provisioning server may include client specific code from handset manufacturer SDKs (Software Development Kit).

The communications interface 305 comprises e.g. transport, network and connectivity for at least a radio frequency interface for wireless wide area network access and a at least one interface for local connectivity, such as Bluetooth, IrDA (Infrared Data Association), WLAN (wireless local area network) access, WiMAX, etc. As is commonly known the communications interface 305 comprises various modules, protocol stacks, drivers, circuitry, hardware components such as antennas, etc., for facilitating said wide area and local area network access and communication. As is well known to a person skilled in the art, the circuitry comprises a series of analogue and digital electronic components, together forming a radio receiver and transmitter.

Figure 3:
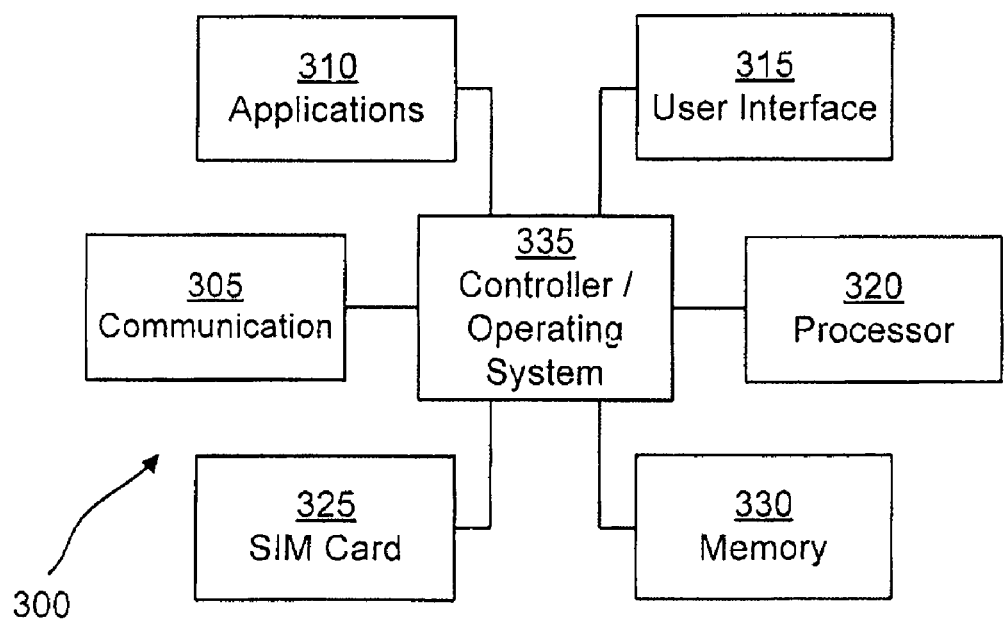
FIG. 3 is a schematic block diagram representing an internal component, software and protocol structure of the mobile terminal shown in FIG. 2.

The multi-mode mobile communication device 200 as represented by the internal components 300 in FIG. 3 may also have a SIM (Subscriber Identity Module) card 325 and an associated reader. As is commonly known, the SIM card 325 comprises a processor as well as local work and data memory. Information on said SIM card 325 may be used to associate said mobile communication device 115, 200 with a unique identity in a wireless wide area network 145.

Figure 4A:
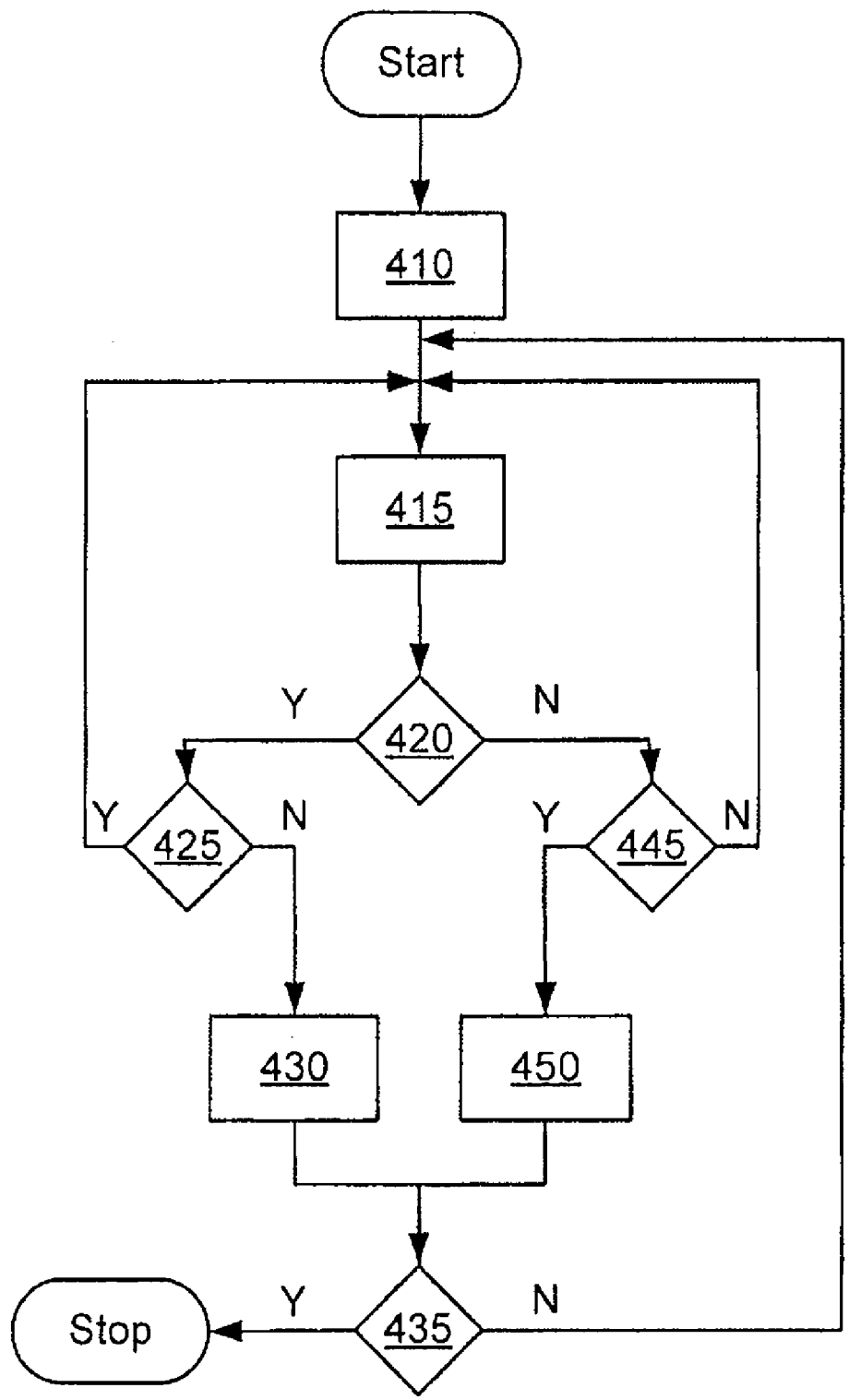
FIG. 4a is a flow chart illustrating a method in a server for handling a connection between a mobile communication device and a second communication device.

Continuing now with FIG. 4a which is a flow chart illustrating a method in the server 135 for handling a connection between a mobile communication device 115 and a second communication device.

The server 135 establishes a connection 410 between the mobile communication device 115 and the server 135. During the communication between said server and said mobile communication device the server receives 415 a signal indicative of a status of the connectivity between said mobile communication device and said wireless local area network 130. The signal indicative of a status of the connectivity between the mobile communication device and the wireless local area network may include one or more packets of data. It may further comprise a stream of data. The signal indicative of the connectivity status may either comprise connectivity information as measured by the mobile communication device. However in a preferred embodiment any measurement, calculation, characterization and/or interpretation of the connectivity status is performed directly in the server. Based on said signal the server may decide 420 whether or not the wireless local area network 130 is available for communication with said mobile communication device.

The signal indicative of the status of the connectivity between the mobile communication device and the wireless local area network may pertain to at least one property selected from: the position and movement of the mobile communication device, the collected statistics of lost and retained connections for the position of the mobile communication device, the bit error rate between the mobile communication device and the wireless local area network, the signal strength between the mobile communication device and the wireless local area network, the number of lost packets between the mobile communication device and the wireless local area network, the number of retransmitted packets between the mobile communication device and the wireless local area network, the signal-to-noise ratio between the mobile communication device and the wireless local area network, the jitter of the signal between the mobile communication device and the wireless local area network, the latency of the signal between the mobile communication device and the wireless local area network, etc.

By comparing said at least one property with at least one suitable threshold the status may then be classified as either good or bad. For example if the estimated, expected, or measured value of the bit error rate between the mobile communication device and the wireless local area network is below a pre-defined threshold the connection may be classified as good; otherwise the connection may be classified as bad. In addition it may be required for the said at least one property to remain above or below said threshold during at least a minimum time period, e.g. in order for the connection to be classified as good said bit error rate may be required to remain below said threshold during said minimum time period.

In a case the connectivity status of the connection between the mobile communication device and the wireless local area network is good the server 135 determines 425 from the signaling from the mobile communication device 115 whether or not the mobile communication device 115 is operatively connected to the wireless local area network 130. In a case the mobile communication device is not operatively connected to the wireless local area network the server facilitates a sticky handover 430 from the wireless wide area network 145 to the wireless local area network 130. More details regarding the sticky handover process will be given below with reference to FIG. 4*b*. In a case the mobile communication device already is operatively connected to said wireless local area network the server waits for another signal from the client.

In a case the connectivity status of the connection between the mobile communication device and the wireless local area network is bad the server 135 determines 445 from the signaling from the mobile communication device 115 whether or not the mobile communication 115 device is operatively connected to the wireless local area network 130. In a case the mobile communication device is operatively connected to the wireless local area network the server facilitates a sticky handover 450 from the wireless local area network 130 to the wireless wide area network 145. In a case the mobile communication device already is operatively connected to said wireless wide area network the server waits for another signal from the client.

The above procedures are repeated until the connection is terminated 435 and the application may be stopped. It is here assumed that the termination process is initiated by either the user of the mobile communication device 115 or the user of the second communication device. The case in which a connection is abruptly terminated due to network conditions will be considered below with reference to FIG. 6.

Figure 4B:
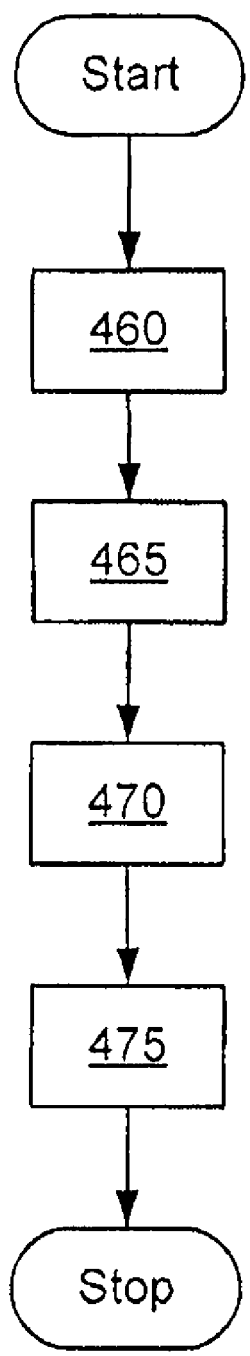
FIGS. 4b-c are flow charts illustrating methods for a sticky handover process according to embodiments.
Figure 4C:
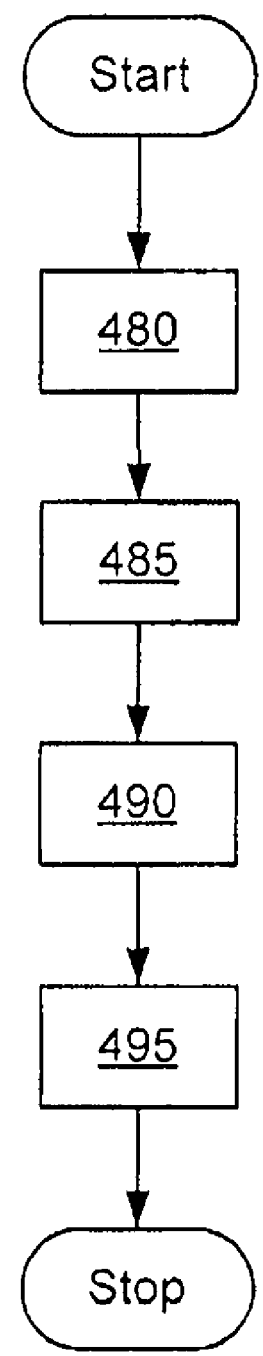

With reference to FIGS. 4*b-c* the sticky handover process will now be described in greater detail. Specific details pertaining to the case in which the handover is from a wireless local area network to a wireless wide area network will be considered in FIG. 4*b*, whereas specific details pertaining to the case in which the handover is from a wireless wide area network to a wireless local area network will be considered in FIG. 4*c*.

If a handover process from the wireless local area network to the wireless wide area network has been decided (FIG. 4*b*) the unique identity (as discussed above with reference to FIG. 3) of the mobile communication device is determined 460 using the wireless local area network address of the mobile communication device. Since the mobile communication device 115 is currently operatively connected to the server 135 via the wireless local area network 145 said wireless local area network address is known to the server 135. The server may thus find said unique identity of the mobile communication device e.g. by performing a table look-up in a data base, which data base may be comprised in the memory 140 of the server 135. Using said unique identity of the mobile communication device the server may initiate 465 a wireless wide area network connection from the server 135 to the mobile communication device 115 using said unique identity. Thus a wireless wide area network connection has thus been formed from the server to the mobile communication device. A connection between said mobile communication device 115 and said second communication device via said server may then be established 470 since said second communication device is operatively connected to the server 135 during the entire duration of the communication between the mobile communication device and the second communication device. When the connection between said mobile communication device 115 and said second communication device has been established the wireless local area network connection between the mobile communication device and the server may be terminated 475.

If a handover process from the wireless wide area network to the wireless local area network has been decided (FIG. 4*c*) the wireless local area network address (as discussed above with reference to FIG. 3) of the mobile communication device is determined 480 using the unique identity of the mobile communication device. Since the mobile communication device 115 is currently operatively connected to the server 135 via the wireless wide area network 130 said unique identity is known to the server 135. The server may thus find said wireless local area network address of the mobile communication device e.g. by performing a table look-up in a data base, which data base may be comprised in the memory 140 of the server 135. Using said wireless local area network address of the mobile communication device the server may initiate 485 a wireless local area network connection from the server 135 to the mobile communication device 115 using said wireless local area network address. Thus a wireless local area network connection has thus been formed from the server to the mobile communication device. A connection between said mobile communication device 115 and said second communication device via said server may then be established 490 since said second communication device is operatively connected to the server 135 during the entire duration of the communication between the mobile communication device and the second communication device. When the connection between said mobile communication device 115 and said second communication device has been established the wireless wide area network connection between the mobile communication device and the server may be terminated 495.

Figure 5:
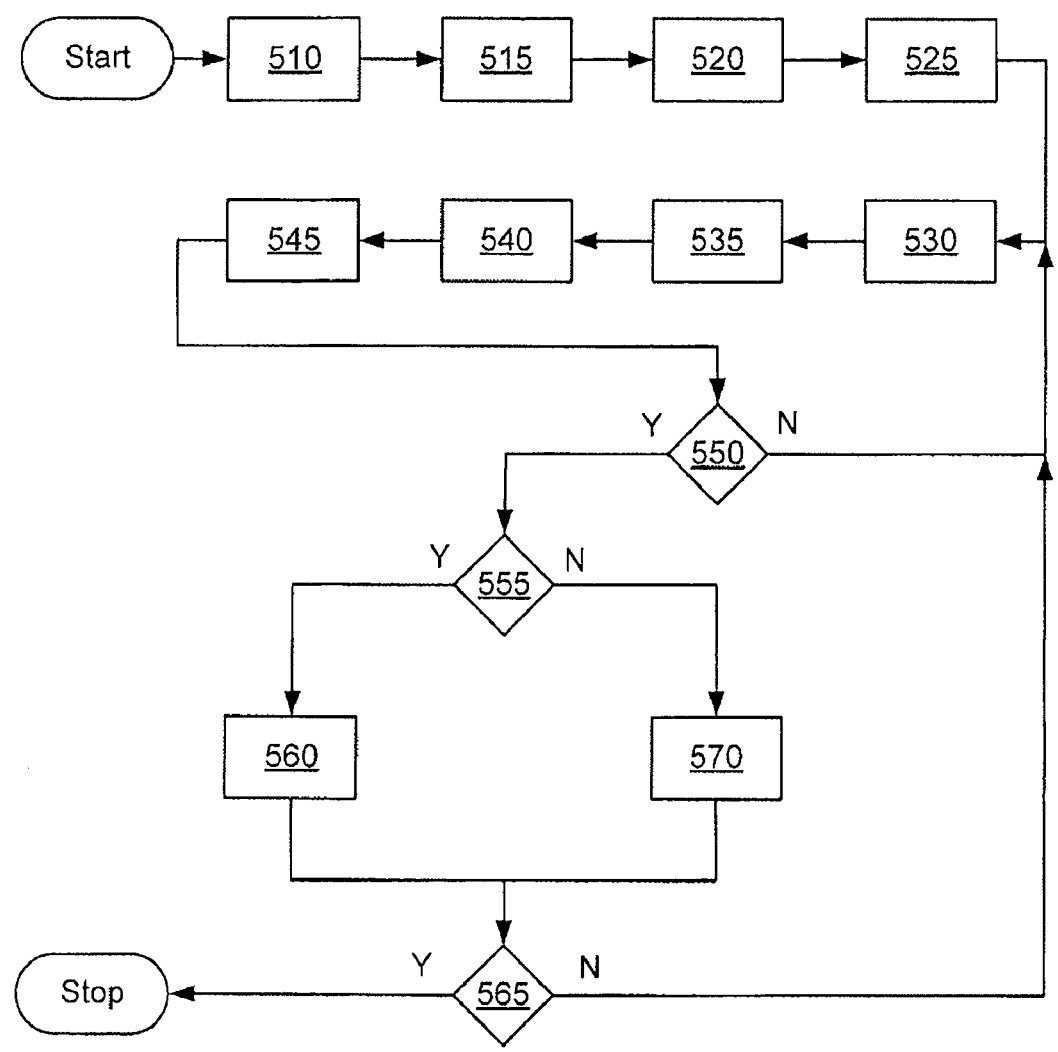
FIG. 5 is a flow chart illustrating a method in a mobile communication device for facilitating a sticky handover process according to an embodiment.

A method in a mobile communication device for facilitating a sticky handover process will now be described with reference to the flow chart of FIG. 5. The mobile communication device 115 is associated 510 with a unique identity in a wireless wide area network. This unique identity may be e.g. a mobile phone number of the mobile communication device 115. To enable a sticky handover functionality client information is received 515. The software pertaining to said client furthermore associates 520 said client information with a wireless local area network address, which address e.g. may be an internet protocol (IP) address. The client software may further configure 525 said mobile communication device to settings for communications over a plurality of different wireless wide area, as well as local, networks. The client may also allow for user defined settings, for example allowing a user to specify a list of preferred networks.

When a connection between the mobile communication device 115 and the server 135 is established and an ongoing communication takes place 530 the mobile communication device may measure 535 a signal indicative of a status of the connectivity between said mobile communication device and said server via a wireless local area network. Information pertaining to said measured signal is transmitted 540 to said server at pre-defined intervals. The mobile communication device receives 545 a signal indicative of a sticky handover from said server, which signals content is based on the servers interpretation of said transmitted information. Note that it may also be possible for the measurement, etc. to be performed directly in the server 135. In this case steps 535 and 540 may be omitted. Depending on said signal the mobile communication device decides 550 whether or not to perform a sticky handover process. In a case a handover is not needed the ongoing communication proceeds 530.

In a case the mobile communication device is connected to the server via said wireless local area network the client initiates a connection switch 560 from said wireless local area network to said wireless wide area network. In a case the mobile communication device is connected to the server via said wireless wide area network the client initiates a connection switch 570 from said wireless wide area network to said wireless local area network. The switch is supervised by the controller 335 in the mobile communication device 115, 200, 300.

The above procedures are repeated until the connection is terminated 565 and the application may be stopped. It is here assumed that the termination process is initiated by either the user of the mobile communication device 115 or the user of the second communication device. The case in which a connection is abruptly terminated due to network conditions will be described next with reference to FIG. 6.

Figure 6:
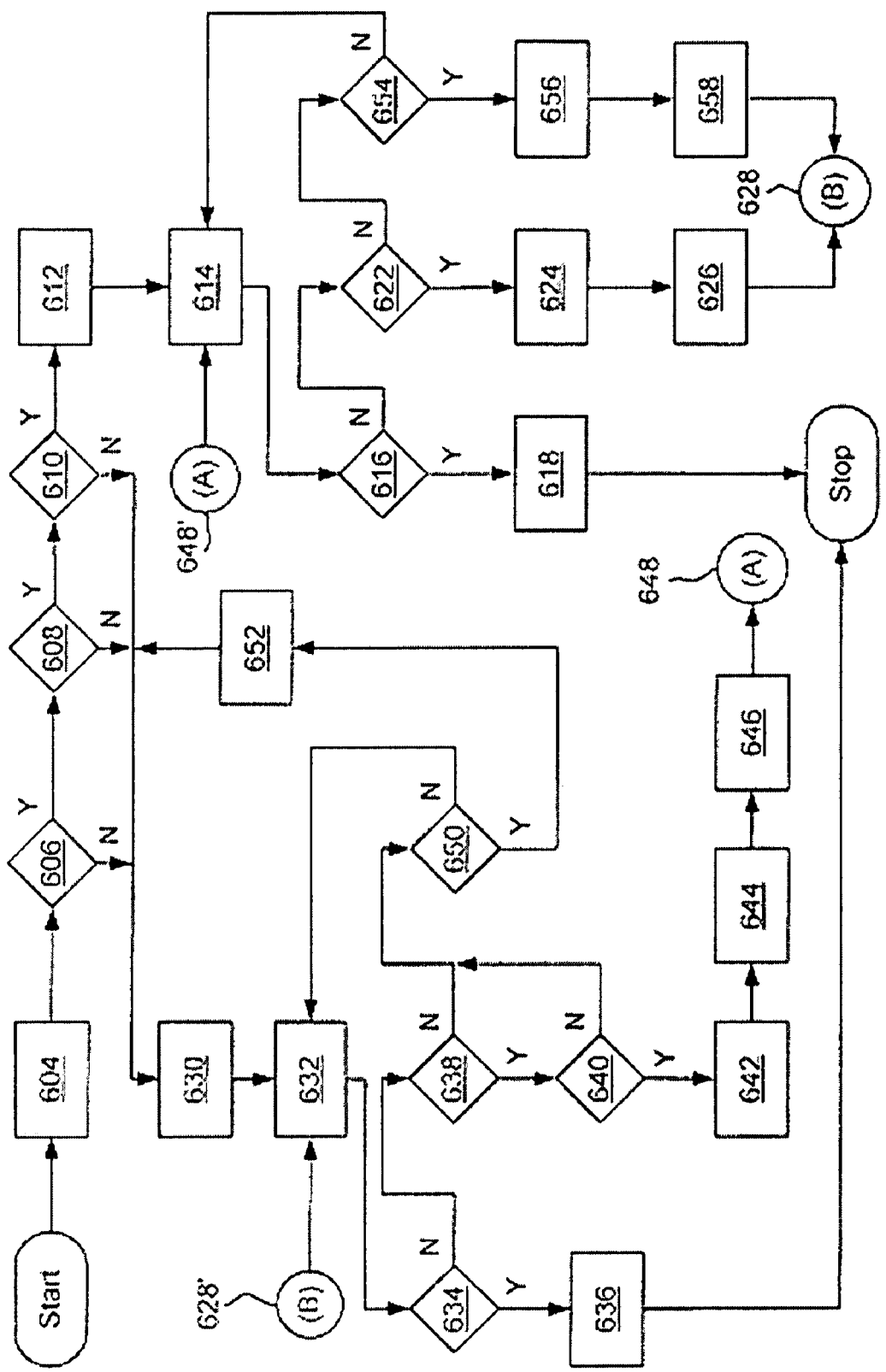
FIG. 6 is a flow chart illustrating a method for handling a connection between a mobile communication device and a second communication device via a server according to an embodiment.

The flow chart of FIG. 6 describes in detail the handling of a connection between a mobile communication device and a second communication device via a server. A connection is requested 604 from either the mobile communication device or said second communication device. As a result of said request it is investigated 606 whether or not the mobile communication device has access to a wireless local area network. If not, a wireless wide area network connection is initiated and established 630.

If the mobile communication device has access to a wireless local area network it is investigated 608 whether or not the mobile communication device is logged on to said accessed wireless local area network. If not, a wireless wide area network connection is initiated and established 630. If the mobile communication device is logged on to said wireless local area network it is investigated 610 if the client is logged on to a SIP (Session Initiation Protocol) server. If not, a wireless wide area network connection is initiated and established 630. If the client is logged on to a SIP server a connection between said mobile communication device and said second communication device is established 612 via said server thus resulting in an ongoing 614 wireless local area network connection between said mobile communication device and said server.

During the ongoing connection in the wireless local area network a number of checking steps will be carried out (not necessarily in the order according to the below). If a signal indicative of a termination is received 616 the connection is terminated 618. If not it is investigated 622 whether or not a handover situation pertaining to a handover from the wireless local area network to the wide area network. If such a handover situation is detected a wireless wide area network connection is initiated and established 624 and the connection is handed over 626 to the wireless wide area network connection. Thus the ongoing connection continues as a wireless wide area network connection (as indicated by the notation (B)-(B) from 628 to 628 in FIG. 6). If a wireless local area network connection is still available it is investigated 654 whether or not the connection is unexpectedly lost.

An unexpectedly loss of connection may be defined as a connection which is lost without a prior indication of termination from either the client or the server. A typical example includes a case in which a mobile communication device currently located at a first location and connected to a wireless local area network moves too fast from said first location to a second location, in which location a valid wireless local area network is not available, for a sticky handover to be performed. A second example includes a case in which a mobile communication device currently located at a first location and connected to a wireless wide area network temporarily moves to a second location, in which location a valid wireless wide area network is not available due to e.g. a fading dip.

If the connection is unexpectedly lost a loss of connection may be indicated 656 from the client to the user of the mobile communication device and/or from the server to the user of the second communication device. Thus such an unexpected loss of connection may be detected by both the client and the server. The indication may e.g. take the form of a pre-recorded voice message which may state that the connection is temporarily lost but that the connection will be re-established again and that no action is required by the user(s).

The connection may be re-established 658 as a wireless wide area connection. This is possible since before the unexpected loss of connection the mobile communication device 115 was operatively connected to the server 135 via the wireless local area network 145, the wireless local area network address of the mobile communication device is known to the server 135. The server may thus find the unique identity of the mobile communication device e.g. by performing a table look-up in a data base, which data base may be comprised in the memory 140 of the server 135. Using said unique identity of the mobile communication device the server may initiate and establish 658 a wireless wide area network connection from the server 135 to the mobile communication device 115 using said unique identity. Whilst awaiting a signal indicative of a new connection between said mobile communication device and said server the mobile communication device may remain in a standby mode. Thus the ongoing connection continues as a wireless wide area network connection 632 (as indicated by the notation (B)-(B) from 628 to 628 in FIG. 6). If the connection is not unexpectedly lost the ongoing connection continues 614 in the wireless local area network.

If a wireless wide area network connection has been established 630 the connection continues as an ongoing wireless wide area network connection 632. During the ongoing connection in the wireless wide area network a number of checking steps will be carried out (not necessarily in the order according to the below). If a signal indicative of a termination is received 634 the connection is terminated 636. If not it is investigated 638 whether or not the mobile communication device has access to a wireless local area network. If the mobile communication device has access to a wireless local area network it is investigated 640 if the client is logged on to a SIP server.

If the client is logged on to said SIP server a wireless local area network connection between the mobile communication device and the server 135 is initiated and established 642. When said wireless local area network connection has been established said server 135 facilitates the handover process 644 of the connection from the wireless wide area network to the wireless local area network, and the wireless wide area network is terminated 646. Thus the ongoing connection continues as a wireless local area network connection 614 (as indicated by the notation (A)-(A) from 648 to 648 in FIG. 6).

If the mobile communication device does not have access to a wireless local area network or if the client is not logged on to a SIP server it is investigated 650 whether or not the wireless wide area connection is unexpectedly lost. If the connection is unexpectedly lost a loss of connection may be indicated 652 from the client to the user of the mobile communication device and/or from the server to the user of the second communication device. Thus such an unexpected loss of connection may be detected by both the client and the server.

The connection may be re-established 630 as a (new) wireless wide area connection. This is possible since before the unexpected loss of connection the mobile communication device 115 was operatively connected to the server 135 via the wireless wide area network 145, the unique identity of the mobile communication device is known to the server 135. The server may thus use the same said unique identity to initiate and establish 630 a (new) wireless wide area network connection from the server 135 to the mobile communication device 115 using said unique identity. Thus the ongoing connection continues as a (new) wireless wide area network connection 632. It should be noted that although the wireless wide area network connection can be regarded as new, the user of the mobile communication device will not have to re-establish a connection, e.g., by dialing a number. This functionality is automatically handled by the server 135. However as is known to a person skilled in the art it may not always be possible to establish such a (new) wireless wide area connection due to the conditions of the wireless wide area network.

In summary, mobile phone numbers (for both wide and local area networks) of the mobile communication device are anchored in a gateway server, which server associates the mobile communication device with one common phone number. Since the gateway server holds the common phone number all incoming calls are picked up by the gateway server, which then forwards the connection to either a wireless local area network, such as VoIP, or a wireless wide area network, such as GSM. Outgoing calls from the mobile communication device are, likewise, made to the gateway server which in turn forwards the connection to the callee. This two stage dialing, which is invisible to the user, is required for the mobile communication device running the client application to freely move the call between networks.

The invention has mainly been described above with reference to a few embodiments. However, as is readily appreciated by a person skilled in the art, other embodiments than the ones disclosed above are equally possible within the scope of the invention, as defined by the appended patent claims.

Generally, all terms used in the claims are to be interpreted according to their ordinary meaning in the technical field, unless explicitly defined otherwise herein. All references to "a/an/said/the [device, component, etc]" are to be interpreted openly as referring to at least one instance of said device, component, etc., unless explicitly stated otherwise. The steps of any method disclosed herein do not have to be performed in the exact order disclosed, unless explicitly stated.

The invention claimed is:

1. A method in a server for handling a connection between a mobile communication device and a second communication device, said server being connected to a wireless local area network and a wireless wide area network, said method comprising:

receiving a signal indicative of a connectivity status between said mobile communication device and said wireless local area network, and depending on said connectivity status, controlling a handover process, wherein in a case where the connectivity status of the connection between the mobile communication device and the wireless local area network is bad and the mobile communication device is connected to the wireless local area network, handing over the connection from the wireless local area network to said wireless wide area network, including determining a unique identity of the mobile communication device using the wireless local area network address of the mobile communication device, initiating said wireless wide area network connection from the server to the mobile communication device using said unique identity, establishing a connection between said mobile communication device and said second communication device via said server, wherein the connection between the mobile communication device and the server is a connection in said wireless wide area network, terminating the wireless local area network connection between the mobile communication device and the server, and in a case where the connectivity status of the connection between the mobile communication device and the wireless local area network is good and the mobile communication device is not connected to the wireless local area network, handing over the connection to the wireless local area network, including associating said mobile communication device with a wireless local area network address, associating said mobile communication device with said unique identity in the wireless wide area network, storing said address and said unique identity, receiving a request for a connection from said mobile communication device to said second communication device, determining said wireless local area network address of the mobile communication device using the unique identity of the mobile communication device, initiating said wireless local area network connection from the server to the mobile communication device using said wireless local area network address, establishing a connection between said mobile communication device and said second communication device via said server, wherein the connection between the mobile communication device and the server is a connection in said wireless local area network, and terminating the wireless wide area network connection between the mobile communication device and the server, in the case where the connectivity status of the connection between said mobile communication device and the wireless local area network is good, initiating a connection between said mobile communication device and said server via said wireless local area network, and in the case where the connectivity status of the connection between said mobile communication device and the wireless local area network is bad, initiating a connection between said mobile communication device and said server via said wireless wide area network establishing a connection between said mobile communication device and said second communication device via said server so that all connections to and from the mobile communication device are anchored in the server, indicating the loss of a wide area network connection from a software client of the mobile communication device to the user of the mobile communication device, and from the server to the user of the second communication device, wherein the server initiates and establishes a new wireless wide area network connection from the server to the mobile communication device using the unique identity.

2. Method according to claim 1, wherein a signaling between said mobile communication device and said server utilizes a general packet radio service in a case said mobile communication device is connected to said server via a wireless wide area network.

3. The method according to claim 1, wherein traffic data communication between said mobile communication device and said server utilizes a general packet radio service in a case said mobile communication device is connected to said server via a wireless wide area network.

4. The method according to claim 1, wherein said signal indicative of the connectivity status between the mobile communication device and the wireless local area network pertains to at least one of:

a position and movement of the mobile communication device, a collected statistics of lost and retained connections for the position of the mobile communication device, a bit error rate between the mobile communication device and the wireless local area network, a signal strength between the mobile communication device and the wireless local area network, a number of lost packets between the mobile communication device and the wireless local area network, a number of retransmitted packets between the mobile communication device and the wireless local area network, a signal-to-noise ratio between the mobile communication device and the wireless local area network, a jitter of the signal between the mobile communication device and the wireless local area network, and a latency of the signal between the mobile communication device and the wireless local area network.

5. The method according to claim 1, wherein said wireless local area network is one of a plurality of available wireless local area networks comprising at least one of: any IEEE 802.11x network, WiMAX, Bluetooth, said wireless wide area network comprising at least one of: UMTS, GPRS, EDGE, GSM, and wherein said wireless local area networks and said wireless wide area networks are prioritized according to a specific order.

6. A method in a server for handling a connection between a mobile communication device and a second communication device, said server being connected to a wireless local area network and a wireless wide area network, said method comprising:

receiving a signal indicative of a connectivity status between said mobile communication device and said wireless local area network, and depending on said connectivity status, controlling a handover process, wherein in a case where the connectivity status of the connection between the mobile communication device and the wireless local area network is bad and the mobile communication device is connected to the wireless local area network, handing over the connection from the wireless local area network to said wireless wide area network, and in a case where the connectivity status of the connection between the mobile communication device and the wireless local area network is good and the mobile communication device is not connected to the wireless local area network, handing over the connection to the wireless local area network, associating said mobile communication device with a wireless local area network Address, associating said mobile communication device with a unique identity in the wireless wide area network, and storing said address and said unique identity, receiving a request for a connection from said mobile communication device to said second communication device, in the case where the connectivity status of the connection between said mobile communication device and the wireless local area network is good, initiating a connection between said mobile communication device and said server via said wireless local area network, and in the case where the connectivity status of the connection between said mobile communication device and the wireless local area network is bad, initiating a connection between said mobile communication device and said server via said wireless wide area network establishing a connection between said mobile communication device and said second communication device via said server so that all connections to and from the mobile communication device are anchored in the server, indicating the loss of a wide area network connection from a software client of the mobile communication device to the user of the mobile communication device, and from the server to the user of the second communication device, wherein the server initiates and establishes a new wireless wide area network connection from the server to the mobile communication device using the unique identity;

detecting that the connection between the mobile communication device and the wireless local area network is lost;

determining said unique identity of the mobile communication device using the wireless local area network address of the mobile communication device; and as a consequence of said detection, using said unique identity to perform said handover of the connection from the wireless local area network to the wireless wide area network.

7. The method according to claim 6, further comprising indicating to said second communication device a temporary loss of connection pertaining to said detection of a lost connection between the mobile communication device and the wireless local area network.

8. The method according to claim 6, wherein a signaling between said mobile communication device and said server utilizes a general packet radio service in a case said mobile communication device is connected to said server via a wireless wide area network.

9. The method according to claim 6, wherein traffic data communication between said mobile communication device and said server utilizes a general packet radio service in a case said mobile communication device is connected to said server via a wireless wide area network.

10. The method according to claim 6, wherein wherein said signal indicative of the connectivity status between the mobile communication device and the wireless local area network pertains to at least one of:
- a position and movement of the mobile communication device,
- a collected statistics of lost and retained connections for the position of the mobile communication device
- a bit error rate between the mobile communication device and the wireless local area network,
- a signal strength between the mobile communication device and the wireless local area network,
- a number of lost packets between the mobile communication device and the wireless local area network,
- a number of retransmitted packets between the mobile communication device and the wireless local area network,
- a signal-to-noise ratio between the mobile communication device and the wireless local area network,
- a jitter of the signal between the mobile communication device and the wireless local area network, and
- a latency of the signal between the mobile communication device and the wireless local area network.

11. The method according to claim 6, wherein said wireless local area network is one of a plurality of available wireless local area networks comprising at least one of: any IEEE 802.11x network, WiMAX, Bluetooth, said wireless wide area network comprising at least one of: UMTS, GPRS, EDGE, GSM, and wherein said wireless local area networks and said wireless wide area networks are prioritized according to a specific order.

12. A method in a server for handling a connection between a mobile communication device and a second communication device, said server being connected to a wireless local area network and a wireless wide area network, said method comprising:

receiving a signal indicative of a connectivity status between said mobile communication device and said wireless local area network, and depending on said connectivity status, controlling a handover process, wherein in a case where the connectivity status of the connection between the mobile communication device and the wireless local area network is bad and the mobile communication device is connected to the wireless local area network, handing over the connection from the wireless local area network to said wireless wide area network, and in a case where the connectivity status of the connection between the mobile communication device and the wireless local area network is good and the mobile communication device is not connected to the wireless local area network, handing over the connection to the wireless local area network, associating said mobile communication device with a wireless local area network address, associating said mobile communication device with a unique identity in the wireless wide area network, and storing said address and said unique identity, receiving a request for a connection from said mobile communication device to said second communication device, in the case where the connectivity status of the connection between said mobile communication device and the wireless local area network is good, initiating a connection between said mobile communication device and said server via said wireless local area network, and in the case where the connectivity status of the connection between said mobile communication device and the wireless local area network is bad, initiating a connection between said mobile communication device and said server via said wireless wide area network establishing a connection between said mobile communication device and said second communication device via said server so that all connections to and from the mobile communication device are anchored in the server, indicating the loss of a wide area network connection from a software client of the mobile communication device to the user of the mobile communication device, and from the server to the user of the second communication device, wherein the server initiates and establishes a new wireless wide area network connection from the server to the mobile communication device using the unique identity;

receiving a request for a connection from said second communication device to said mobile communication device, requesting a status signal from said wireless local area network indicative of a connection between said server and said mobile communication device;

initiating a connection between said server and said second communication device;

in the case the mobile communication device is connected to said wireless local area network, initiating a connection between said mobile communication device and said server via said wireless local area network, and in the case the mobile communication device is not connected to said wireless local area network, initiating a connection between said mobile communication device and said server via said wireless wide area network, and establishing a connection between said mobile communication device and said second communication device via said server.

13. The method according to claim 12, wherein a signaling between said mobile communication device and said server utilizes a general packet radio service in a case said mobile communication device is connected to said server via a wireless wide area network.

14. The method according to claim 12, wherein traffic data communication between said mobile communication device and said server utilizes a general packet radio service in a case said mobile communication device is connected to said server via a wireless wide area network.

15. The method according to claim 12, wherein said signal indicative of the connectivity status between the mobile communication device and the wireless local area network pertains to at least one of:
- a position and movement of the mobile communication device,
- a collected statistics of lost and retained connections for the position of the mobile communication device
- a bit error rate between the mobile communication device and the wireless local area network,
- a signal strength between the mobile communication device and the wireless local area network,
- a number of lost packets between the mobile communication device and the wireless local area network,
- a number of retransmitted packets between the mobile communication device and the wireless local area network,
- a signal-to-noise ratio between the mobile communication device and the wireless local area network,
- a jitter of the signal between the mobile communication device and the wireless local area network, and
- a latency of the signal between the mobile communication device and the wireless local area network.

16. The method according to claim 12, wherein said wireless local area network is one of a plurality of available wireless local area networks comprising at least one of: any IEEE 802.11x network, WiMAX, Bluetooth, said wireless wide area network comprising at least one of: UMTS, GPRS, EDGE, GSM, and wherein said wireless local area networks and said wireless wide area networks are prioritized according to a specific order.

* * * * *